Aug. 12, 1924.
L. F. DOUGLASS
1,504,328
METHOD AND APPARATUS FOR PRODUCING MULTIPLE AND PHANTOM IMAGE
EFFECTS IN PHOTOGRAPHY
Filed April 18, 1922
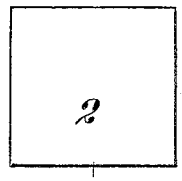
*Fig. 1.*
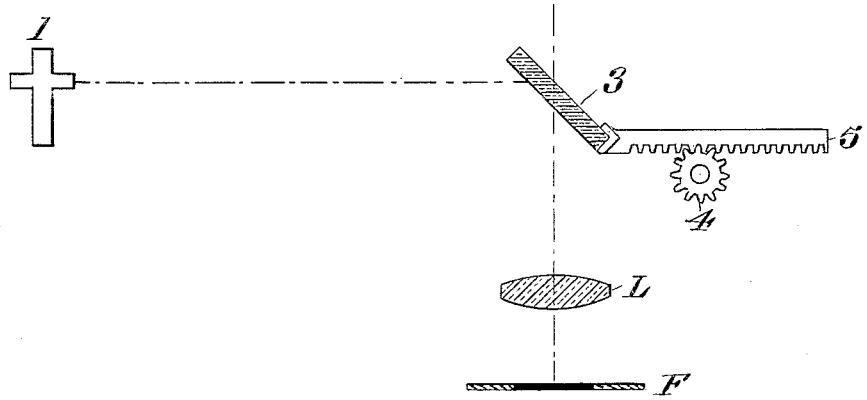
*Fig. 2.*
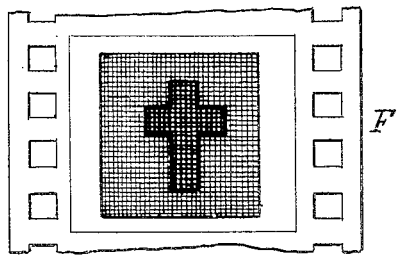
Inventor.
Leon F. Douglass.
By J.E. Trabucco
Attorney.

Patented Aug. 12, 1924.

1,504,328

UNITED STATES PATENT OFFICE.

LEON F. DOUGLASS, OF MENLO PARK, CALIFORNIA.

METHOD AND APPARATUS FOR PRODUCING MULTIPLE AND PHANTOM IMAGE EFFECTS IN PHOTOGRAPHY.

Application filed April 18, 1922. Serial No. 555,088.

*To all whom it may concern:*

Be it known that I, LEON F. DOUGLASS, a citizen of the United States, residing at Menlo Park, in the county of San Mateo and State of California, have invented new and useful Improvements in Methods and Apparatus for Producing Multiple and Phantom Image Effects in Photography, of which the following is a specification.

This invention relates to the method and apparatus whereby indistinct or visionary appearing image effects of a single object or scene may be produced upon a single film or plate simultaneously with an image of a separate object or scene.

An object of my invention is to provide a novel method and improved apparatus whereby an indistinct or phantom image effect of an object may be produced simultaneously with an ordinary image of a separate object upon a single photographic film or plate.

Another object of my invention is to provide apparatus of the type just characterized which may be readily applied to an ordinary camera without alteration or change being made in its mechanism or construction.

Another object of my invention is to provide a novel method and improved apparatus whereby novel effects may be secured upon a single film or plate by manipulating a partial-light-reflecting element to reflect an image of an object through a lens onto a sensitized film or plate and at the same time allow the light rays from another object to proceed through the light-reflecting element and lens onto the film.

Another object of the present invention is to provide apparatus of the type just characterized with means for moving the partial-light-reflecting element along a plane at right angles to the axis of the lens, thereby at will, causing a phantom-like image of an object to gradually appear, disappear or move across the said film, while an image of another object remains stationary thereon.

Stated broadly, the invention comprises in combination with a sensitized film or plate and a lens for focusing images onto said film, a semi-light-reflecting element which reflects an indistinct image of an object through the lens onto the sensitized film, at the same time the light rays from another object proceed through said light-reflecting element and said lens onto said film.

Generally stated, I so position a semi-light-reflecting mirror in front of a camera lens, that it is in the path of the light rays from an object to be photographed positioned at approximately right angles with reference to the axis of said lens, and reflect an indistinct image thereof through said lens onto a sensitized film or plate, while the light rays from another object immediately in front of said lens are made to travel through said semi-light-reflecting mirror and said lens onto said film, whereby novel and phantom-like image effects may be produced upon a single film or plate by a single exposure. The position of the reflected image upon the film with respect to its width will vary according to the manipulating or moving of the semi-light-reflecting mirror backward or forward along the plane which lies at right angles in reference to the axis of the lens.

In order to increase the number of novel and multiple image effects that may be secured, I associate with the semi-light-reflecting mirror, a rack and pinion, which may be manipulated so as to move the reflected image either backward or forward across the film. By thus moving the semi-light-reflecting mirror, and by successively exposing the film, a shade or visionary appearing image may be made to appear as moving across a distinct scene or object, thereby producing a phantom-like effect upon the film.

Any suitable semi-light-reflecting element which will reflect some of the light rays from an object and at the same time permit the light rays from another object to pass through it, may be employed. Although clear glass may be used I have found that a negative plate treated first with hypo and later dyed yellow, produces the most satisfactory results.

The invention is capable of being carried out in a variety of ways and of receiving a variety of mechanical expressions, one of which is illustrated in the accompanying drawings, but it is to be expressly understood that the drawings are for purposes of illustration only and are not to be construed as a definition of the limits of the invention, reference being had to the appended claims for that purpose.

In said drawings, in which for the sake of clearness, the images on the film are shown as large as the objects photographed:—

Fig. 1 is a diagrammatic view illustrating the relative arrangement of the two objects to be photographed, the semi-light-reflecting element, the means for manipulating the same, the lens and the photographic film; and Fig. 2 is an enlarged diagrammatic fragment of a photographic film upon which an indistinct image of an object together with an ordinary image of another object are produced.

Referring to Fig. 1, object 1 is positioned at approximately right angles, with reference to the axis of the lens L, which may be the lens of any suitable camera, and object 2 is positioned directly in front of the camera and lens L. Interposed in the path of the light rays emanating from object 1, is a semi-light-reflecting mirror 3, which is constructed of ordinary clear glass capable of reflecting only a portion of the rays of light striking its reflecting surface, so positioned that it will reflect a portion of the rays of light through the lens L and onto a sensitized film or plate F. Directly in front of the camera lens L is another object 2, the light rays from which proceed through the semi-light-reflecting mirror, 3 and lens L onto film F.

The image of object 2 is comparatively more pronounced and clear than the image of object 1, when produced upon the film, the reason being that the intensity of the light rays proceeding to film F from object 2 is not appreciably affected by passing through the semi-light-reflecting mirror 3, while the intensity of the light rays from object 1 after being reflected by mirror 3 is appreciably lessened owing to the fact that a great portion of the said rays are not reflected thereby, but pass through said mirror.

Attached to semi-light-reflecting mirror 3 by means of any suitable means such as screws or rivets, is rack 5 which engages with pinion 4. By manipulating and turning pinion 4, the rack 5 together with said mirror 3, are moved on a plane that is at right angles to the axis of lens L, in and out, as is desired. Thus, if it is desired to have a phantom image of object 1 gradually disappear from the film F, the pinion 4 is turned until the said image is no longer reflected through lens L and onto film F. And similarly if it is desired to firstly have an image of object 2 appear alone upon the film and a phantom image of object 1 gradually move across it, the said mirror 3 is positioned so that the rays of light from object 1 are not reflected through lens L; then by means of pinion 4 the said mirror is gradually moved until an indistinct image of object 1 is reflected through the lens on to the said film, and by the continued turning of pinion 4 in the same direction, the said image of object 1 may be made to gradually move across the said film. It is therefore evident that by successively exposing said film and by moving the said mirror in and out, an indistinct or phantom-like image of object 1 may be produced on film F, simultaneously with a clear and distinct image of object 2.

It will therefore be perceived that I have provided a method and apparatus for producing multiple and phantom-like image effects upon a single film or plate by a single exposure, and although I have explained but a few of the novel effects which may be produced, it is evident that there are many other novel effects which may be produced, by means of the apparatus herein illustrated and described.

In carrying out this invention it is not necessary that clear glass or stained glass be employed as a semi-light reflecting element. Any suitable means which reflects only a portion of the light rays striking its reflecting surface and at the same time does not appreciably lessen the intensity of the light rays from another source which pass through it, can be utilized in carrying out this invention. Therefore "semi-light-reflecting mirrors" as herein employed is to be construed generally as referring to any suitable medium which reflects only a portion of the light rays striking its reflecting surface and which coincident therewith does not appreciably lessen the intensity of the light rays passing through it from another source.

Although I have illustrated and explained my invention as referring to the photographing of objects, it is to be expressly understood that separate scenes or combinations of objects may be photographed in the same manner and with the same apparatus as are the separate objects photographed. Therefore the term "object" as herein employed is to be construed generally as referring to scenes and combinations of objects as well as to individual objects.

While the embodiments of the invention illustrated on the drawings have been described with particularity, it is to be expressly understood that I am not limited to any particular detail of construction, as changes may be made in the means for manipulating the semi-light-reflecting element, without departing from the spirit of this invention. Nor am I limited to any particular kind or form of photography or cinematography. Nor am I limited to the use of any particular character of sensitized element from which the negative is to be formed, and the term "film" as employed in the claims is to be construed as generic to plates or other suitable sensitized elements. Reference is therefore to be had to the claims hereto appended for a definition of the limits of the invention.

What I claim is:—

1. The method of producing phantom image effects upon a photographic film, which comprises interposing a semi-light-reflecting element in the path of the light rays from an object, reflecting an indistinct image of said object through a lens onto a sensitized film, simultaneously directing the light rays from another object through said semi-light-reflecting element and said lens onto said film, lineally moving said element to different positions and making successive exposures and lineally moving said reflected light rays across said film.

2. The method of producing visionary image effects on a photographic film, which comprises interposing a semi-light-reflecting element in the path of the light rays from an object positioned at right angles to the axis of a lens, reflecting an indistinct image of said object through said lens onto said film, directing the light rays from another object positioned in front of said semi-light-reflecting element and said lens, through said semi-light-reflecting element and said lens onto said film, exposing said film, moving said semi-light-reflecting element to change the position of the reflected image upon said film, and making successive exposures.

3. Means for producing phantom image effects upon a photographic film comprising, in combination with a lens, a semi-light-reflecting element adapted to reflect an indistinct image of an object through said lens onto said film and to permit an image of another object to proceed through said semi-light-reflecting element and said lens onto said film, and means for lineally moving said semi-light-reflecting element to cause said reflected image to assume different positions on said film.

4. In a device of the class described, the combination of a lens, a semi-light reflecting element adapted to both reflect an indistinct image of an object through said lens onto a film, and to permit an image of another object to pass through said element and said lens onto said film, and means for lineally moving said element to change the position of said reflected image on said film.

5. The method of producing composite image effects of a plurality of objects on a sensitized film which consists in reflecting an indistinct image of one of said objects through a lens onto said film by interposing a semi-light-reflecting member in the path of light rays from said objects, allowing the light rays from another object to proceed through said member and said lens onto said film, lineally moving said member to different positions, and making successive exposures.

6. The method of producing composite image effects on a sensitized film which comprises effecting an indistinct image of an object through a camera lens onto said film by interposing a semi-light-reflecting element in the path of the light rays from said object, allowing the light rays from another object to proceed through said element and said lens onto said film, lineally moving said element to cause the reflected image to assume different positions on said film, and making successive exposures.

LEON F. DOUGLASS.